United States Patent [19]

Melby

[11] 4,327,613
[45] May 4, 1982

[54] APPARATUS FOR MACHINING AXLE SHAFTS

[76] Inventor: Curtis W. Melby, 2800 - 36th Ave. NE., Minneapolis, Minn. 55418

[21] Appl. No.: 178,298

[22] Filed: Aug. 15, 1980

[51] Int. Cl.$^3$ .............................. B23B 3/22; B23B 5/28
[52] U.S. Cl. ........................................ 82/4 R; 82/4 B; 82/8
[58] Field of Search .............................. 82/4 R, 4 B, 8

[56] References Cited

U.S. PATENT DOCUMENTS

| | | |
|---|---|---|
| 78,733 | 6/1868 | Goff . |
| 84,954 | 12/1868 | Maltby . |
| 99,993 | 2/1870 | Wright . |
| 105,007 | 7/1870 | Smith et al. . |
| 258,053 | 5/1882 | Greer . |
| 308,925 | 12/1884 | Pedrick . |
| 388,745 | 8/1888 | Urquhart . |
| 734,639 | 7/1903 | Wallenstein . |
| 770,381 | 9/1904 | McMillen ............................ 82/4 B |
| 1,054,607 | 2/1913 | Pearce ................................ 82/4 R |
| 1,059,635 | 4/1913 | Purcell . |
| 1,154,343 | 9/1915 | Saunders ............................ 82/4 R |
| 2,051,070 | 8/1936 | Barker ................................ 82/4 B |
| 2,357,803 | 9/1944 | Barrett . |
| 2,519,087 | 8/1950 | Tydeman . |
| 3,115,055 | 12/1963 | Sepulveda ........................... 82/4 R |
| 3,379,080 | 4/1968 | Massa . |
| 4,130,034 | 12/1978 | Benoit . |
| 4,161,127 | 7/1979 | Tiffin ................................. 82/4 R |

Primary Examiner—Harrison L. Hinson
Attorney, Agent, or Firm—Orrin M. Haugen; Thomas J. Nikolai

[57] ABSTRACT

Apparatus for the in-place machining of trailing axle spindles of self-propelled motor vehicles utilizing a spindle shaft retained within a housing. The apparatus includes frame means with inner and outer end panels, and with the inner end panel having a bore for receiving a spindle shaft therethrough. Clamping means are arranged to dispose the bore concentrically with the spindle being machined. Drive means are provided, along with a main drive shaft mounted for rotation within each of the end panels. A second drive shaft in the form of an hexagonal drive shaft is also mounted for rotation within the end panels. Cutter head carriage sleeve means are journably mounted on the drive shaft and include a carriage body along with a hollow cylindrical housing journably secured to the body and having a plurality of radially disposed cutting blades coupled thereto. Preferably, an uneven plural number of such cutting heads are utilized to provide for proper treatment of the work. A lead screw shaft extends between the opposed panel members and is journably coupled to each. Tooth means are secured to the carriage body and engage the lead screw shaft means, with further means being provided to supportedly couple the carriage body to the lead screw and to the drive shaft.

4 Claims, 8 Drawing Figures

APPARATUS FOR MACHINING AXLE SHAFTS

BACKGROUND OF THE INVENTION

The present invention relates generally to an axle shaft turner, and more specifically to an apparatus for the off-highway in-place machining of spindle shafts on self-propelled motor vehicles which utilize a dead shaft or spindle secured adjacent the opposed ends of a housing. The apparatus is designed for field operation, and is particularly useful and desirable in the re-machining of spindle shafts of large trailers or trucks, particularly such trailers or trucks which have suffered damage to the spindle due to bearing failure or the like.

In the utilization of over-the-road trucks, wheel bearings may fail from time to time, and such instances normally occur on occasions when the vehicle is traveling in areas remote from a service facility. When bearings fail, spindles tend to suffer damage from the failure, and when the bearing is replaced, the damaged spindle shaft must be treated so as to become true along a central axis, free of roughened zones, and frequently rethreaded at the outer ends. Since the apparatus of the present invention is light in weight, and readily portable, it is designed for use in the field on an off-highway basis and may be used to machine and/or thread the spindle of a heavy vehicle such as a truck or trailer, while it is disabled along the roadside. The apparatus employs its own drive power, and the user may select a motor that operates from a 12-volt DC battery supply or 110 AC supply, or from any other suitable power source, preferably a portable source. The apparatus is efficient in its operation, low in cost, and capable of use without requiring an expensive lathe bed or the like.

SUMMARY OF THE INVENTION

Basically, the apparatus of the present invention includes a frame upon which is mounted a drive motor, and which includes belt means for driving a main drive shaft. The main drive shaft is, in turn, provided with a second drive belt or drive chain appropriately timed which rotates an idler shaft, and through which, gear reduction is provided for driving the lead screw. A carriage body is provided which includes a carriage sleeve journably mounted upon the drive shaft and having a hollow cylindrical housing secured for rotation within the body and having a plurality of radially disposed cutting heads coupled thereto. Upon actuation of the drive motor, the carriage sleeve rotates about the spindle shaft being machined, and rotation of the lead screw shaft provides the axial movement necessary to move the carriage sleeve along the length of the spindle shaft for truing the same, and, if need is indicated, threading the same.

In extreme conditions, where the spindle is badly damaged, it may be necessary to place weldments along the length of the axle shaft in order to have sufficient material upon which to work to restore the spindle shaft.

Therefore, it is a primary object of the present invention to provide an improved apparatus for machining spindles of self-propelled motor vehicles or trailers, and particularly apparatus for field treatment of spindles while in-place on the vehicle.

It is a further object of the present invention to provide an apparatus for the off-highway in-place machining of spindles of self-propelled motor vehicles or trailers which utilize a spindle retained or secured to a housing, and wherein the spindle is treated so as to be concentric with the housing.

It is yet a further object of the present invention to machine damaged axle shafts of self-propelled motor vehicles or trailers while the axle shaft is in-place on the vehicle, and particularly the in-place machining of axle shafts following damage due to bearing failure or the like.

Other and further objects of the present invention will become apparent to those skilled in the art upon a study of the following specification, appended claims, and accompanying drawings.

DESCRIPTION OF THE PREFERRED EMBODIMENT

Figure 1:
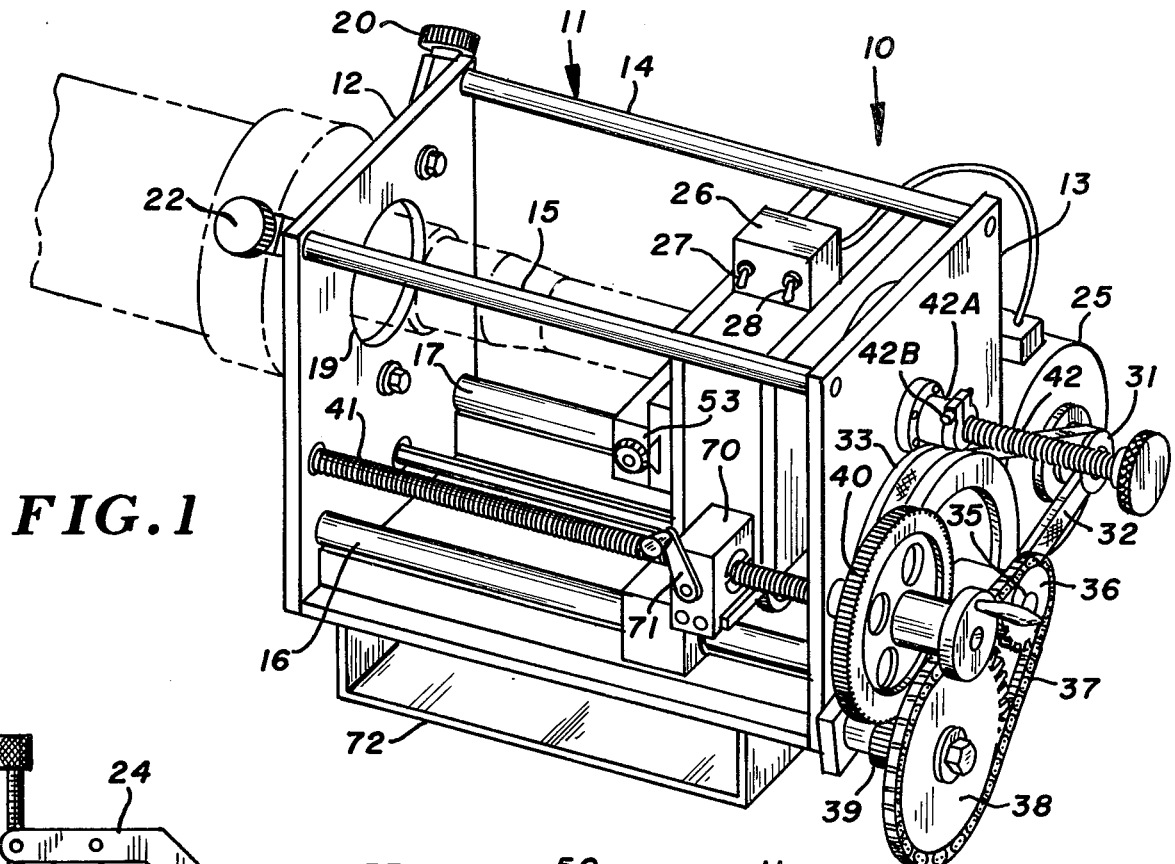
FIG. 1 is a perspective view illustrating the machining apparatus of the present invention, and illustrating, in phantom, a spindle and housing of a trailer vehicle upon which the machining apparatus is mounted.
Figure 2:
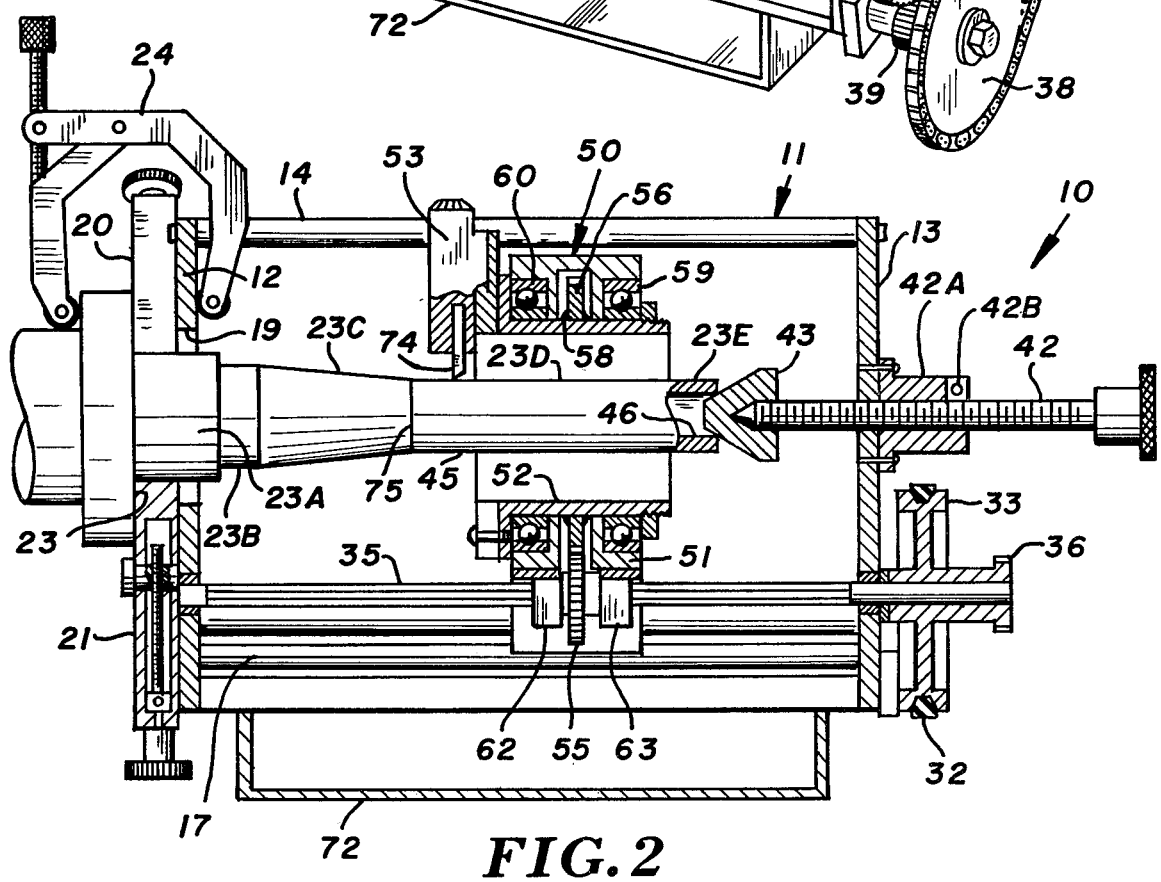
FIG. 2 is a vertical sectional view taken axially through the center of the apparatus, and further illustrating, in partial section, the spindle and housing of the trailer vehicle upon which the apparatus is mounted.
Figure 3:
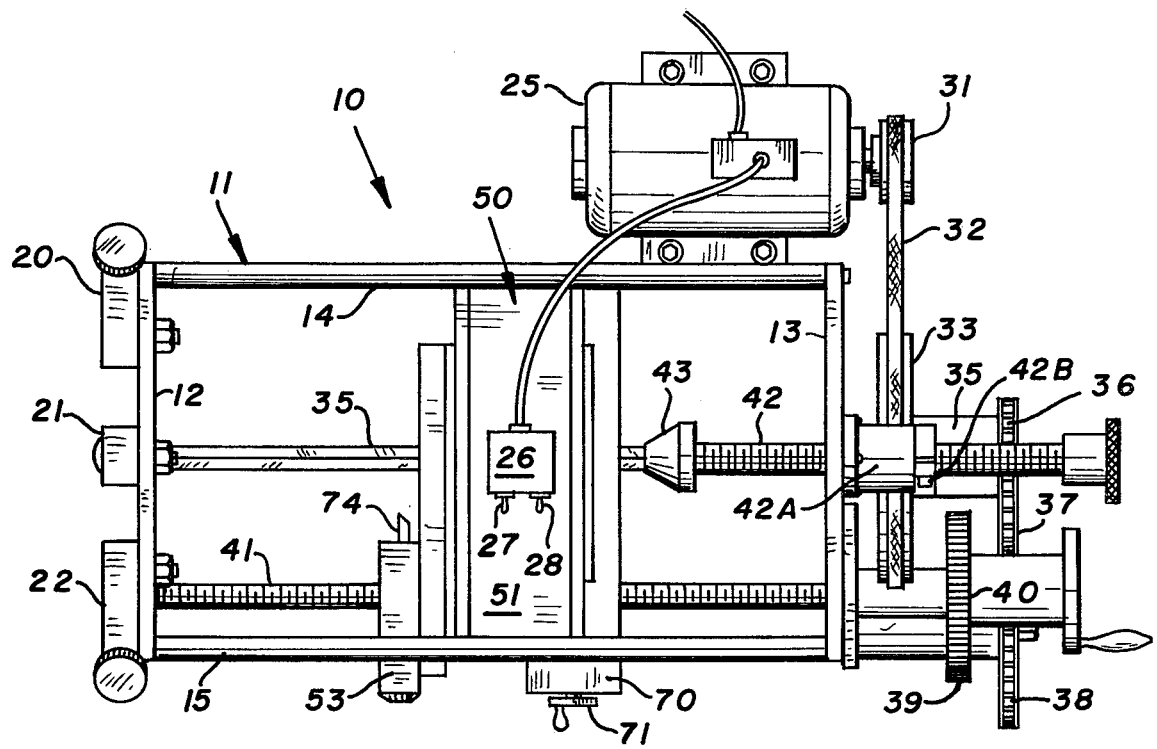
FIG. 3 is a top elevational view of the apparatus, with FIG. 3 showing the device removed from the trailer.
Figure 4:
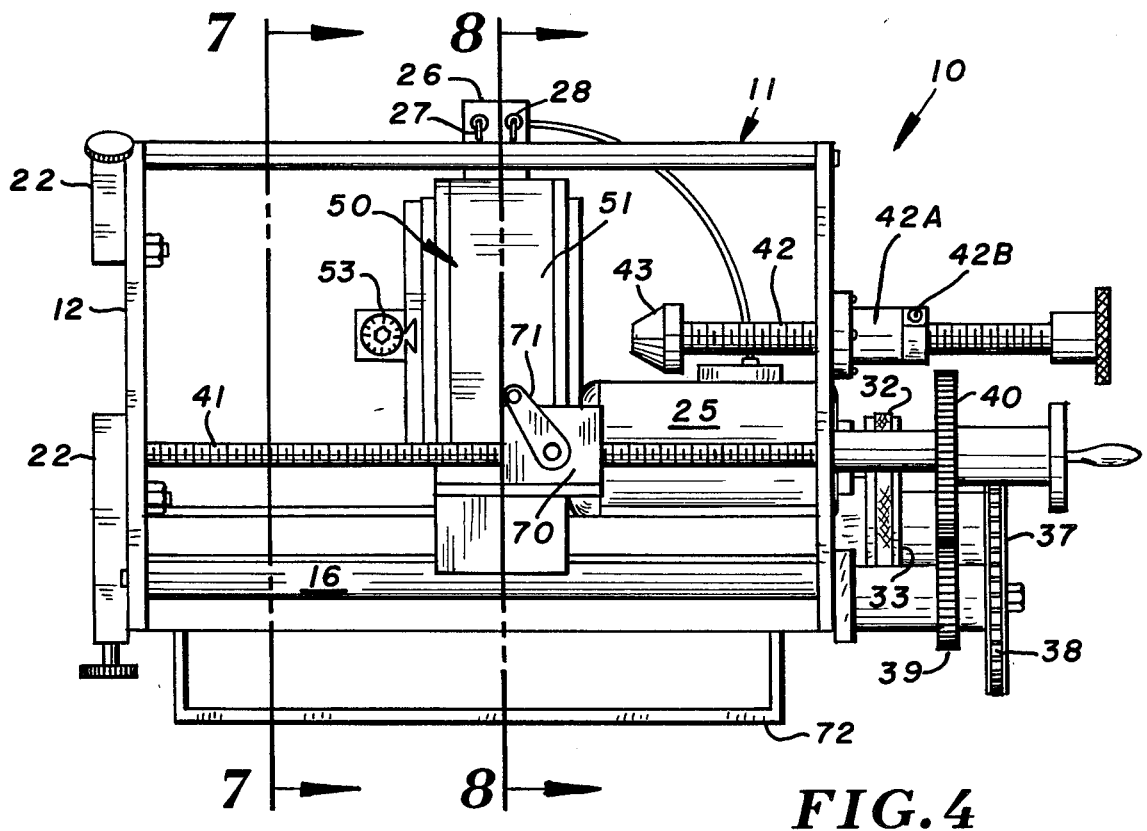
FIG. 4 is a side elevational view of the apparatus along the same side as illustrated in the perspective view of FIG. 1.
Figure 5:
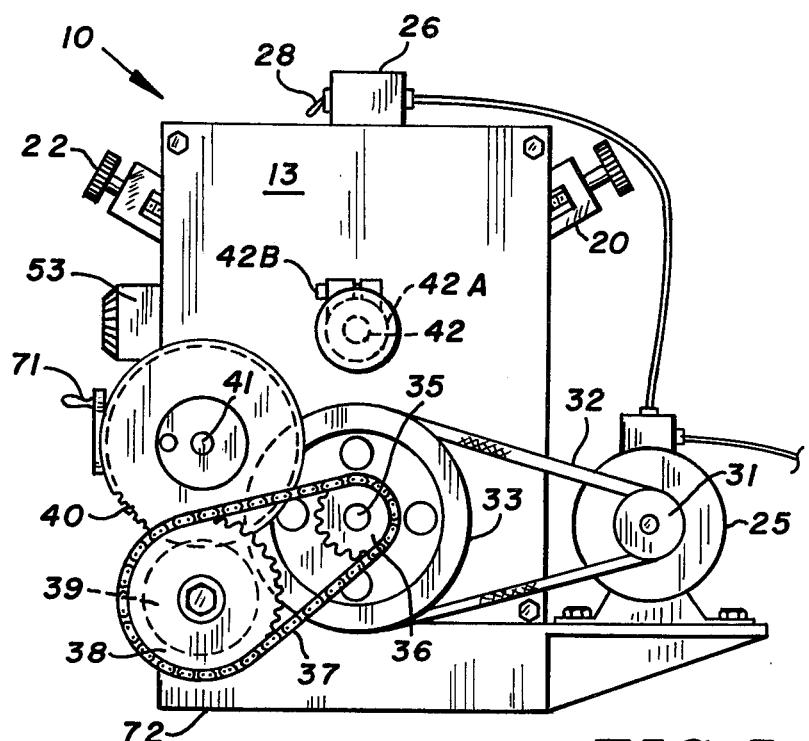
FIG. 5 is a front view of the apparatus and illustrating the various drive pulleys and drive sprockets in their various relationships.
Figure 6:
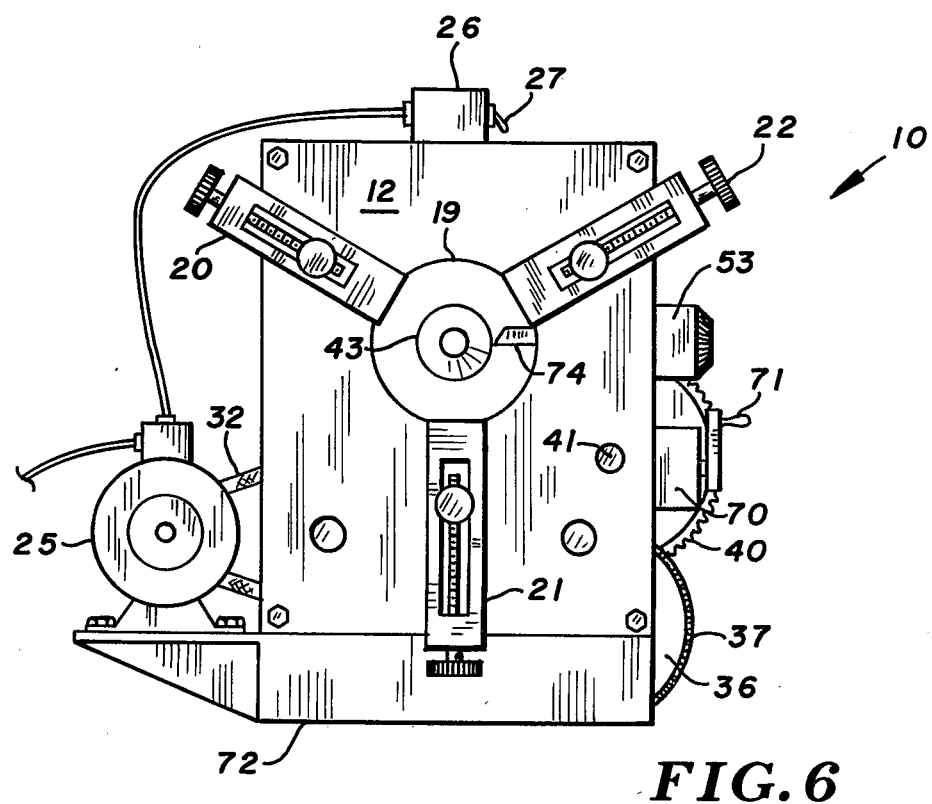
FIG. 6 is a rear view of the apparatus, and illustrating the details of the mechanism for releasably clamping the apparatus to an axle.
Figure 7:
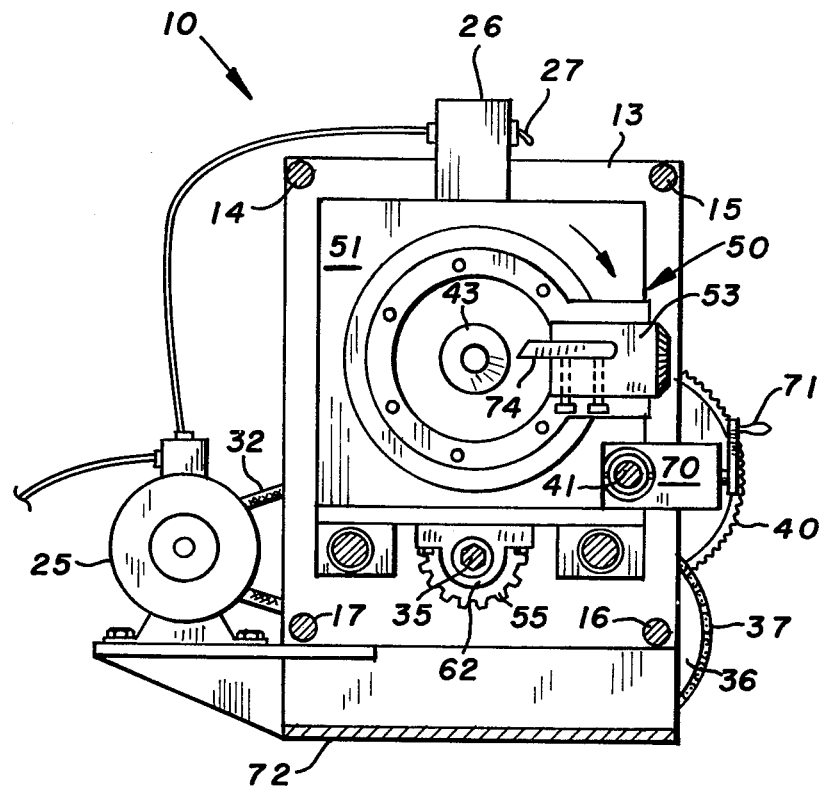
FIG. 7 is a sectional view taken along the line and in the direction of the arrows 7—7 of FIG. 4.

In accordance with the preferred embodiment of the present invention, and with particular attention being directed to FIGS. 1 and 2 of the drawings, the apparatus for in-place machining of spindles generally designed 10 includes a frame means shown generally at 11, the frame means including inner and outer opposed end panels 12 and 13 with axially extending frame shafts or bars 14, 15, 16, and 17 extending therebetween. Inner panel 12 has a bore formed therein as at 19, with the bore being arranged to receive the spindle being machined therewithin. Centering means are provided as at 20, 21 and 22 for centering and releasably mounting the apparatus upon the spindle in a manner concentric with the spindle axis and its support. As indicated in FIGS. 1 and 2, the apparatus 10 is mounted flush against the outer surface or face of the support or housing, as at 23. This mounting is undertaken with the centering devices 20, 21 and 22 in place, and with the clamping means, such as clamp 24 retaining the apparatus flush against the surface 23. As is indicated, the faces of the individual centering devices 20, 21, and 22 are held in firm contact with outer surface 23 which is the junction surface between the center axle and the spindle. The seal surface is shown at 23A, the inner bearing surface at 23B, the conical segment at 23C and the outer bearing surface at 23D. A threaded segment is shown at 23E.

Power for driving the unit is provided in the form of motor 25, with motor 25 being suitably controlled by switch members 26. Switches 26 are utilized to energize the motor 25, in an on-off mode, as well as for either fast or slow operation, with these functions being readily obtained from one switch button as at 27, and with switch button 28 preferably being utilized for forward or reverse rotation of motor 25. Motor 25, as indicated, is secured to the frame through brackets 30, and as is conventional, has an output shaft to which is secured a drive pulley as at 31. Drive pulley 31 drives endless V-belt 32, which, in turn, is wrapped about main driven pulley 33. Main driven pulley 33 is fast upon drive shaft 35, with a second drive in the form of a sprocket 36 being fast on shaft 35 as well. Sprocket 36 is provided with an endless drive chain 37 which is, in turn, wrapped about idler sprocket 38. Idler 38, in turn, has a spur gear 39 with its teeth in mesh with the teeth of a second spur gear 40. Spur gear 40 is fast upon lead screw shaft 41.

With continuing reference in FIGS. 1 and 2, axle shaft centering means are provided for axial movement within the outer panel member 13, such as threaded centering shaft or screw 42 which is received within threaded collar member 42A. Threaded collar member 42A is, of course, fixed to the surface of panel 13, and is provided with a threaded tightener element in the form of a tightening collar 42B. At the inner end of centering shaft 42 is disposed centering cone 43. Centering cone 43 is utilized to engage the hollow center portion of the axle shaft being treated, such as spindle 45, shown with its hollow segment as at 46. The conical member 43 may be appropriately referred to as a centering head.

Figure 8:
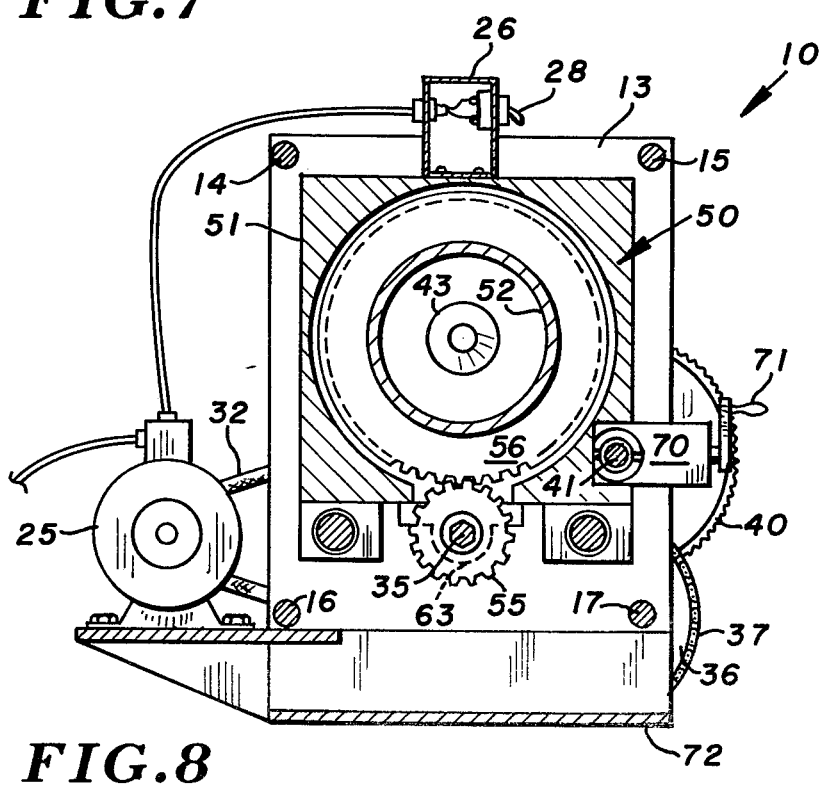
FIG. 8 is a vertical sectional view taken along the line and in the direction of the arrows 8—8 of FIG. 4.

For undertaking the actual work on the surface of spindle 45, a carriage sleeve means shown generally at 50 is provided. The carriage sleeve means 50 is journably mounted upon the drive shaft and includes a carriage body 51 which supports, for rotation, a hollow cylindrical housing 52 carrying a radially disposed cutting head as at 53 thereon. Cutting head 53 is arranged to rotate with the hollow cylindrical housing about the spindle. The cutting heads are preferably included in an odd number of integral units, with one being shown as preferable, but with three being useful. It will be appreciated, however, that other numbers may be suitably employed, including even numbers of such cutting heads. A first drive gear means is arranged for rotation with the drive shaft, such as illustrated in FIG. 2 at 55. (See also FIG. 8.) The teeth of gear 55 are in mesh with the teeth of gear 56, with gear 56 having its inner peripheral surface secured, as by welding, to the surface of hollow cylinder 52, as illustrated at 58. Drive chains and sprockets may be suitably employed. Ball bearings are provided to permit rotation of sleeve 52 within housing 51, with the bearings being shown at 59 and 60. As is apparent from the views in FIGS. 2 and 8, the drive gear 55 is arranged for axial motion along drive shaft 35. Pillow blocks as shown in FIG. 2 as at 62 and 63 assist in securing housing 51 to lead screw shaft 41 and drive shaft 35.

Attention is now directed to lead screw 41 and its associated components. Lead screw 41 is journably coupled to each of the panel members at opposed ends thereof. The lead screw shaft is threaded, as is conventional, and provides a drive means for moving the carriage body along its working path. Lead screw 41, as indicated, is driven through spur gear 40, and the threaded portions of lead screw 41 are engaged with the split nut member 70. Handle member 71 is utilized to move the segments of split nut member 70 toward and away from each other, so as to permit engagement between the threaded portions of split nut 70 and lead screw 41. In this fashion, split nut 70 along with pillow blocks 62 and 63 provide supportable coupling between the carriage body and the frame.

In operation, therefore, the operator initially places the apparatus 10 in a position to be mounted upon the axle shaft of the vehicle being treated. Support base 72 may be utilized to assist in the initial set-up of the device relative to the spindle axis. Centering means such as centering means 20, 21, and 22 are then utilized to provide coaxial relationship between the carriage sleeve means and the spindle being treated, so as to provide an ultimate coaxial relationship between the cutting heads and the spindle axis. With the centering screw 42 engaging the center of the spindle, one or more clamps, such as clamp 24, is set in place to retain the machining apparatus in its proper disposition. With the carriage body retracted to the far right as illustrated in FIG. 1, the motor 25 is energized by means of control switches 26, 27 and 28, and the hollow cylindrical housing is set into motion, thereby causing the cutter such as shown at 74 to engage the surface of the spindle being treated. Axial movement on a straight forward continuous basis is provided by means of the lead screw and the split nut mount. The axial motion, in combination with the rotational motion, is continued until the cutter reaches the full extent of the position desired, such as at the juncture between conical segment 75 separating the bearing surfaces along the spindle surface being treated.

I claim:
1. Apparatus for the in-place machining of spindles of self-propelled motor vehicles and trailer vehicles utilizing a spindle retained along an axle and comprising:
 (a) frame means including inner and outer end panels with axially extending bars secured therebetween, said inner end panel having a bore formed therein for receiving a spindle shaft therethrough when said apparatus is secured to a vehicle, centering and clamping means for releasable mounting of said frame means upon said vehicle and providing for portions of said frame means to be secured against the outer surface of said axle at the junction with the spindle and rendered fast therewith;
 (b) motor means secured to said frame means and having an output drive pulley, pulley means including a driven pulley and a driven pulley shaft, and an idler pulley means including an idler pulley and an idler pulley shaft, with said pulley shafts being mounted for rotation within said opposed end panels;
 (c) first endless drive means drivably coupling said output drive pulley to said driven pulley, and second endless drive means drivably coupling said driven pulley to said idler pulley, and with said driven pulley being fast upon said driven pulley shaft, and said idler pulley being fast upon said idler pulley shaft;
 (d) spindle centering means secured for axial movement within said outer panel member and including an elongated shaft threadedly engaged within said outer panel member and having a centering head at the inner face end thereof for releasable engagement with the outer edge of the spindle being machined;

(e) carriage sleeve means journably mounted upon said driven shaft and including a carriage body, a hollow cylindrical housing secured to said body and with a plurality of radially disposed cutting heads coupled thereto in substantially equally arcuately spaced relationship, one with another, and arranged for rotation with said hollow cylindrical housing about said spindle, first drive gear means arranged for arcuate rotation with said driven shaft and for axial movement therealong, and second drive gear means secured to said hollow cylindrical housing for rotation with said hollow cylindrical housing about said spindle being machined;

(f) lead screw shaft means extending between said outer panel means and journably coupled to each of said opposed panel members at opposed ends thereof, and having drive means drivably coupled to said idler shaft for rotation therewith, and drive means secured to said carriage body and engaged with said lead screw shaft means; and (g) means supportably coupling said carriage body to said lead screw and to said driven shaft.

2. The apparatus as defined in claim 1 being particularly characterized in that said carriage body is supportably coupled to said lead screw by a pair of spaced apart pillow blocks.

3. The apparatus as defined in claim 1 being particularly characterized in that said carriage body is secured to said lead screw by split nut means.

4. The apparatus as defined in claim 1 being particularly characterized in that means are provided for temporarily securing said centering shaft to said outer panel member.

* * * * *